(12) United States Patent
Seong (10) Patent No.: US 11,058,255 B2
(45) Date of Patent: Jul. 13, 2021

(54) GRILL USING FLUE

(71) Applicant: GOODLETECH, CO. LTD., Wonju-si (KR)

(72) Inventor: Nakyoung Seong, Seongnam-si (KR)

( * ) Notice: Subject to any disclaimer, the term of this patent is extended or adjusted under 35 U.S.C. 154(b) by 115 days.

(21) Appl. No.: 16/488,943

(22) PCT Filed: Jun. 23, 2017

(86) PCT No.: PCT/KR2017/006636
§ 371 (c)(1),
(2) Date: Aug. 27, 2019

(87) PCT Pub. No.: WO2018/169134
PCT Pub. Date: Sep. 20, 2018

(65) Prior Publication Data
US 2020/0008618 A1  Jan. 9, 2020

(30) Foreign Application Priority Data

Mar. 14, 2017 (KR) .................. 10-2017-0031863

(51) Int. Cl.
*A47J 37/07* (2006.01)
*F24B 1/20* (2006.01)
(Continued)

(52) U.S. Cl.
CPC ....... *A47J 37/0718* (2013.01); *A47J 37/0786* (2013.01); *F24B 1/20* (2013.01);
(Continued)

(58) Field of Classification Search
CPC ............... A47J 37/0718; A47J 37/0786; A47J 2037/0795
See application file for complete search history.

(56) References Cited

U.S. PATENT DOCUMENTS 5,070,777 A * 12/1991 Novak ................ A47J 37/0786
99/482
5,404,801 A * 4/1995 Holland .............. A47J 37/0786
126/25 R
(Continued)

FOREIGN PATENT DOCUMENTS

KR  10-0875556  12/2008
KR  10-1365308  2/2014
(Continued)

OTHER PUBLICATIONS

English Specification of 10-0875556.
(Continued)

*Primary Examiner* — David J Laux
(74) *Attorney, Agent, or Firm* — Antonio Ha & U.S. Patent, LLC (57) ABSTRACT

A grill using a flue, of the present invention, can provide healthy food by allowing meat, fish and the like to be cooked without being burnt since high-temperature smoke, which is to be generated while firewood burns in the combustion chamber of a firewood combustion cylinder, is supplied to the inside of the flue chamber of a cooking hot plate, is guided along a smoke guide plate, and is simultaneously discharged to the outside through a smoke outlet, thereby slowly heating a cooking iron plate. In addition, support members fixed to the bottom surface are provided so as to be height-adjustable, thereby stably fixing the grill. Additionally, since an oil outlet is formed at the upper edge of the cooking iron plate, the oil to be generated during meat cooking is discharged to the combustion chamber of the firewood combustion cylinder so as not to remain on the cooking iron plate, and thus the present invention is sanitary and provides an ease of cleaning and the like.

6 Claims, 7 Drawing Sheets

(51) Int. Cl.
   *F24B 5/06*     (2006.01)
   *F24C 15/14*    (2006.01)
   *F24C 15/20*    (2006.01)
(52) U.S. Cl.
   CPC .............. *F24B 5/06* (2013.01); *F24C 15/14* (2013.01); *F24C 15/2042* (2013.01); *A47J 2037/0795* (2013.01)

(56) References Cited

U.S. PATENT DOCUMENTS

| | | | | |
|---|---|---|---|---|
| 5,505,190 | A * | 4/1996 | Kalenian | A47J 37/0786 126/25 R |
| 7,469,630 | B1 * | 12/2008 | Ray | A47J 37/0786 99/482 |
| 7,694,626 | B2 * | 4/2010 | Davis | A47J 37/0786 99/482 |
| 2009/0199839 | A1 * | 8/2009 | Hulsey | A47J 37/07 126/25 A |
| 2014/0123972 | A1 * | 5/2014 | Prapas | F24B 1/202 126/77 |

FOREIGN PATENT DOCUMENTS

| KR | 10-2016--0086089 | 7/2016 |
|---|---|---|
| KR | 10-1671938 | 11/2016 |

OTHER PUBLICATIONS

English Specification of 10-1365308.
BradJ127, Nov. 2010, Youtube URL: https://www.youtube.com/watch?v=YNX5i8hihg8.
English Specification of 10-1671938.
English Specification of 10-2016--0086089.

\* cited by examiner

GRILL USING FLUE

TECHNICAL FIELD

The present invention relates to a roasting device using an air flue, and more particularly, to a roasting device using an air flue in which high-temperature smoke generated while fuel wood is burned in a fuel wood combustion container is induced in an air flue chamber and a cooking steel plate is gradually heated so as to cook meat, fish, or the like without being burned.

BACKGROUND ART

In general, roasting devices that roast meat are classified according to a heat source into a roasting device using gases, a roasting device roasting meat on a gridiron above heated charcoal, and the like. Gas fire and charcoal fire have different heat transferring methods, that is, gas fire uses convection currents and charcoal fire uses radiation. When meat is roasted using a charcoal fire, protein and fat, which are main nutrients of meat, are melted to form a film on a surface of the meat such that the film keeps moisture in the meat from escaping therefrom to heat an inside of the meat and potassium generated while a fire is made with charcoal neutralizes fatty acid included in the meat and brings out a distinctive flavor. Also, when meat is roasted using a gas fire, not only moisture on a surface of the meat but also moisture therein are evaporated such that the meat becomes tough and a taste thereof becomes worse as the meat is roasted. Accordingly, recently, roasting using a charcoal fire has been preferred over roasting using a gas fire.

Korean Patent Registration Nos. 10-0875556 (titled Smoking barbecue roaster) and 10-1365308 (titled Instantaneous charcoal roasting device) disclose related arts with respect to a roasting device using a charcoal fire.

Among the related arts, Korean Patent Registration No. 10-0875556 may reduce a cooking time by installing a cover on a roasting device to prevent heat loss and may effectively cook using smoke by keeping smoke, which is generated by adding wood to charcoal, from escaping outside therefrom. Also, since embers are kept and saved for a certain time period by preventing a charcoal fire from going out completely after cooking is finished and cooking is possible using the embers without newly igniting for the certain time period, a user's convenience may be improved.

Also, according to Korean Patent Registration No. 10-1365308, a vertical fuel wood insertion portion at one end of a roasting device, through which fuel wood is insertable, may function as a chimney for smoke simultaneously while a campfire atmosphere is created. Simultaneously, an effect is provided of instantaneously using charcoal generated from the inserted fuel wood as charcoal for roasting.

However, in the above-described related arts, since meat, fish, or the like is disposed on top of a roasting plate and smoke generated by a charcoal fire is directly applied thereto, that is, the smoke is used for fired roasting, when fire power is increased or a cooking time is increased, there is a problem in that meat, fish, or the like is burned. Also, since fuel wood is inserted into a roasting container body and is ignited and then skewered meat or the like is inserted into an upper part of a roasting container and is roasted by directly applying fire power of fuel wood thereto, there is a problem in that the meat or the like is easily burned.

DETAILED DESCRIPTION OF THE INVENTION

Technical Problem

The present invention is directed to providing a roasting device using an air flue, in which high-temperature smoke generated by burning fuel wood in a combustion chamber of a fuel wood combustion container is supplied and induced to an inside of an air flue chamber and a cooking steel plate thereabove is gradually heated so as to cook meat, fish, or the like without being burned.

Technical Solution

According to an aspect of the present invention, there is provided a roasting device including a fuel wood combustion container having a semispherical shape in which a fuel wood loading place for loading fuel word thereon is mounted on an inner circumferential surface thereof and a combustion chamber with an open top is formed, a cooking grill plate connected to an upper part of the fuel wood combustion container to be openable or closable by a horizontal opening or closing member and in which an air flue chamber, into which high-temperature smoke generated in the combustion chamber flows, is formed to cook meat and fish with smoke, a smoke outlet fastened to an upper part of the cooking grill plate to communicate with the air flue chamber to discharge smoke outside, an ash pan and air adjusting unit provided to communicate with a lower part of the fuel wood combustion container to adjust an inflow of air into the roasting device and on which ashes generated in the fuel wood combustion container are disposed, and a support member including height adjusting legs provided equidistantly in an area below the ash pan and air adjusting unit to support the roasting device in a balanced manner.

Effects of the Invention

According to the embodiment of the present invention, high-temperature smoke generated while fuel wood is burned in a combustion chamber of a fuel wood combustion container is supplied to an inside of an air flue chamber of a cooking grill plate and is induced along a smoke inducing plate simultaneously while being discharged outside through a smoke outlet such that a cooking steel plate is gradually heated so as to cook meat, fish, or the like without being burned to provide healthy food. Also, an upper part of the cooking steel plate is divided in half such that hexagonal grooves in which fat is collected to prevent meat being cooked from being stuck are arranged in a honeycomb structure and horizontal protrusions are formed to form stripes on meat being cooked so as to improve quality of the meat. Also, outside air may be supplied by including an ash pan and air adjusting unit below a fuel wood combustion chamber to supply the outside air to an inside of the combustion chamber. Since smoke is discharged through a smoke outlet assembled with a multistage structure, not only is ignition possible in a short time but also ash treatment is possible so as to provide user's convenience. Also, a height-adjustable support member fixed to a bottom surface is provided to stably support the roasting device. Also, a fat outlet is formed in an upper edge of a cooking steel plate such that fat generated while meat is cooked is discharged into a combustion chamber of a fuel wood combustion container and does not remain on the cooking steel plate to provide conveniences in hygiene, cleaning, and the like.

MODE FOR CARRYING OUT THE INVENTION

Hereinafter, an embodiment of the present invention will be described as follows with reference to the attached drawings.

Figure 1:
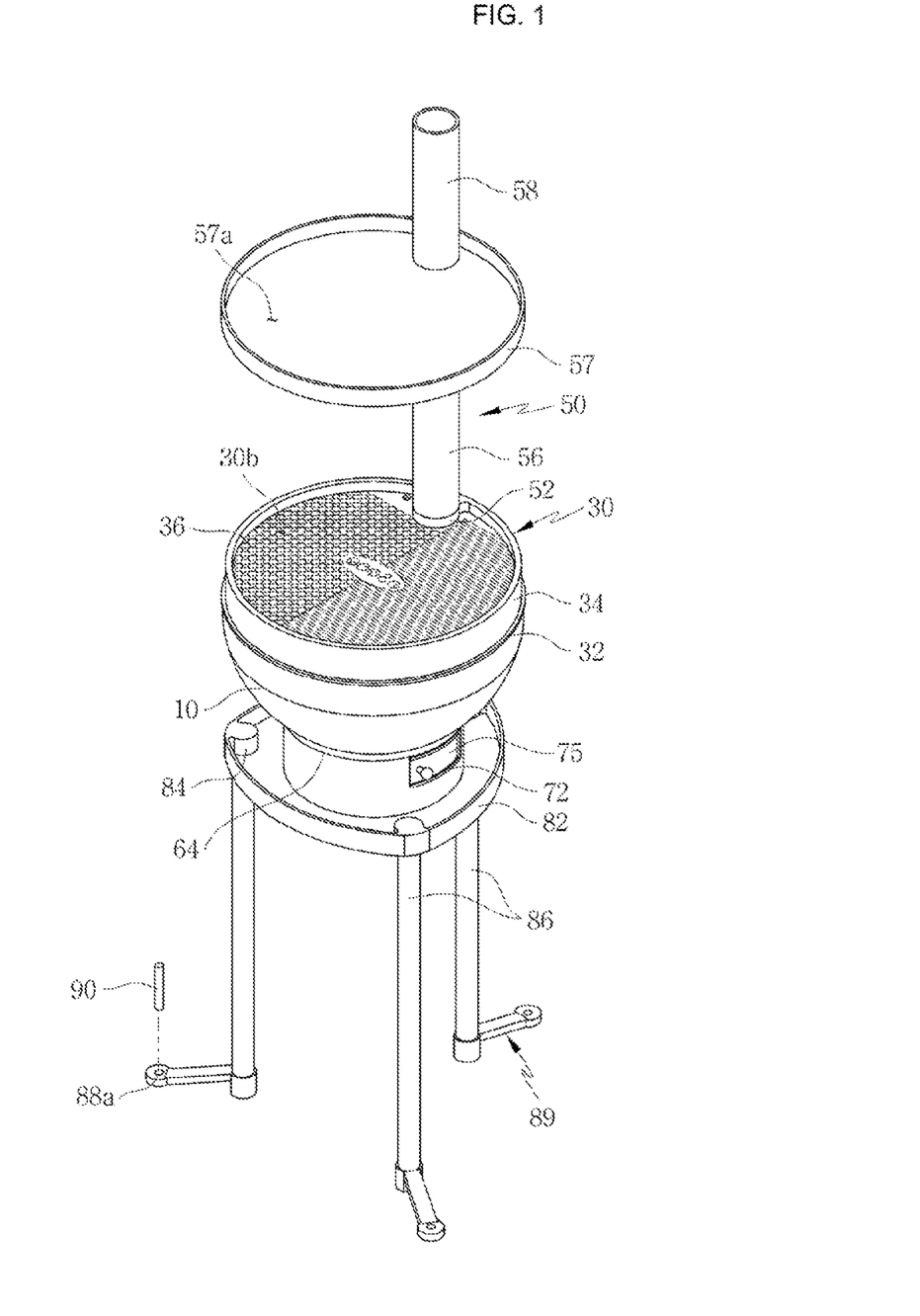
FIG. 1 is a perspective view of a roasting device using an air flue according to an embodiment of the present invention.
Figure 2:
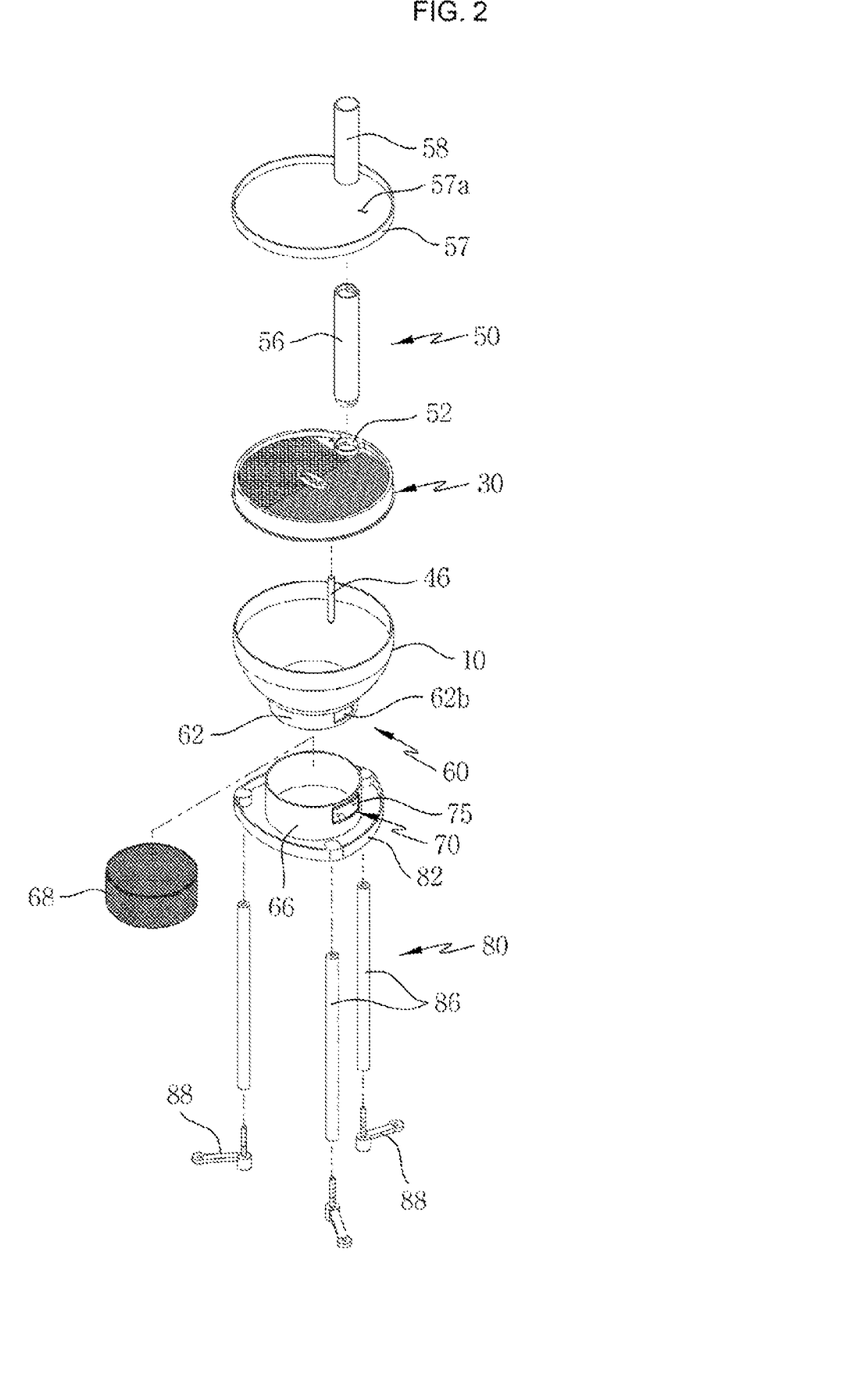
FIG. 2 is an exploded perspective view of the roasting device using the air flue according to the embodiment of the present invention.
Figure 3:
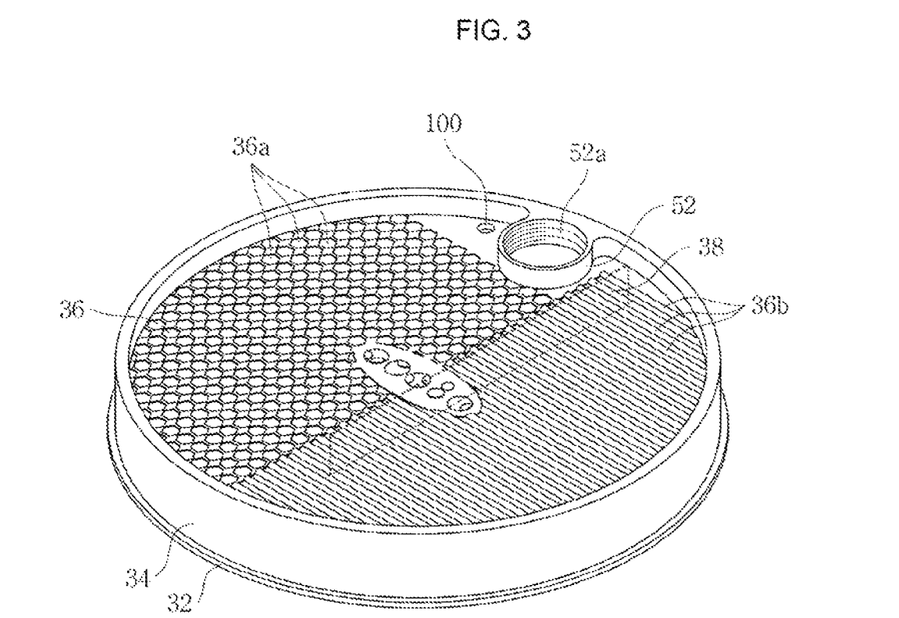
FIG. 3 is a perspective view illustrating a cooking grill plate of the roasting device using the air flue according to the embodiment of the present invention.
Figure 4:
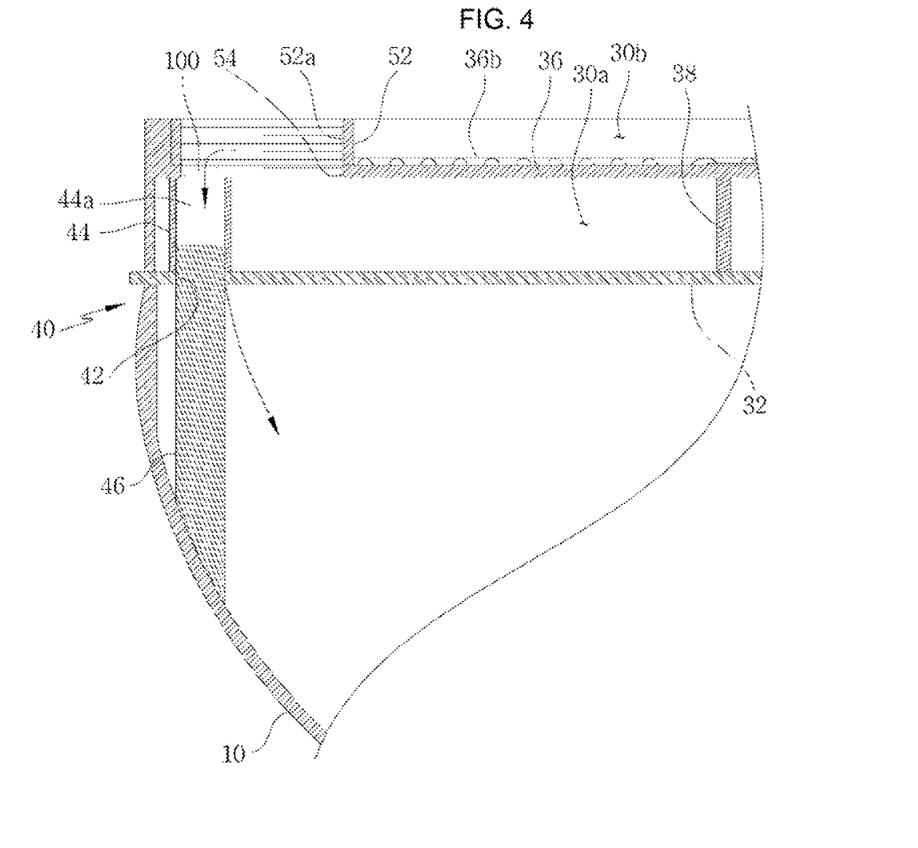
FIG. 4 is a cross-sectional configuration diagram illustrating a horizontal opening or closing member of the roasting device using the air flue according to the embodiment of the present invention.
Figure 5:
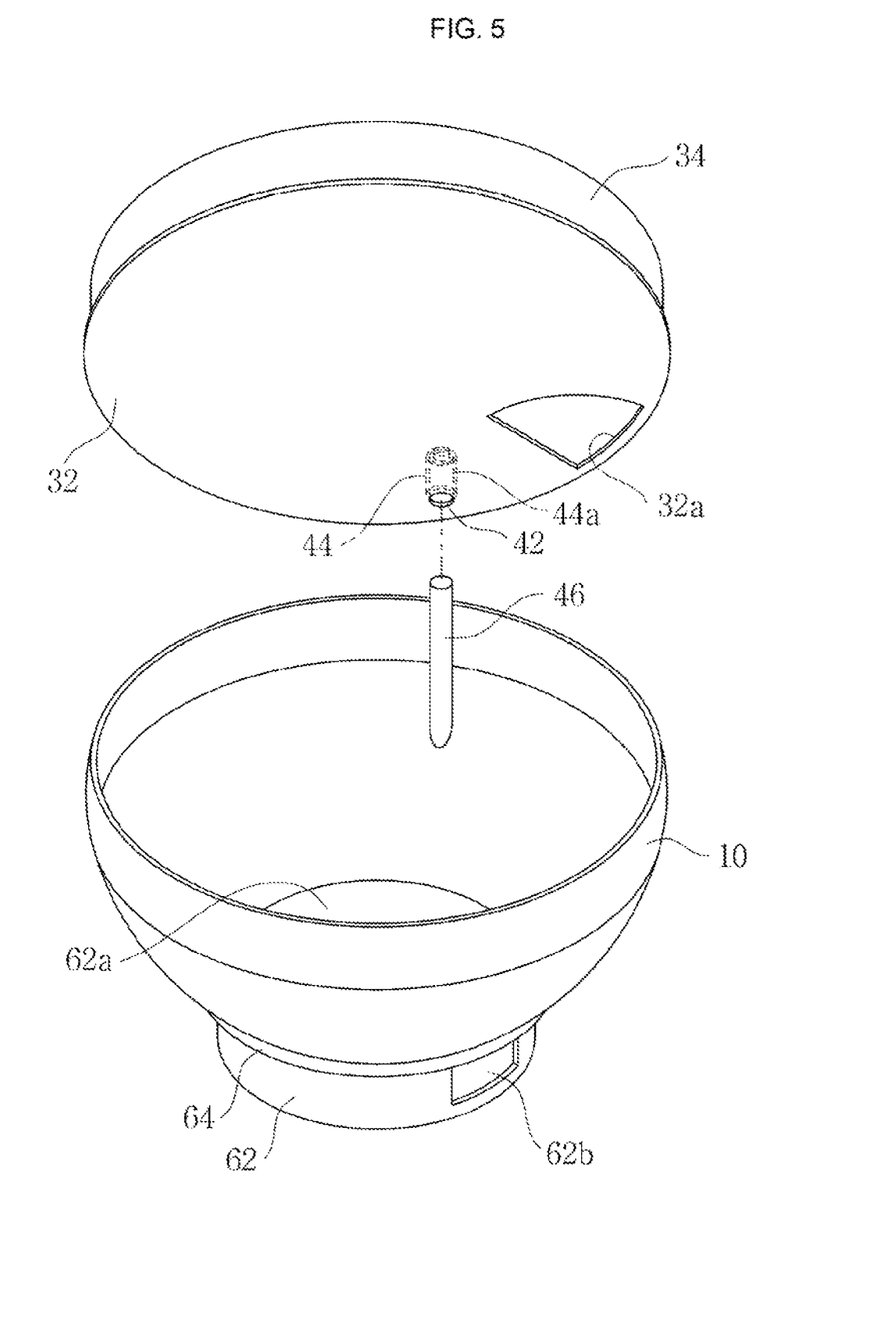
FIG. 5 is an exploded perspective view illustrating a fuel wood combustion container and the cooking grill plate of the roasting device using the air flue according to the embodiment of the present invention.

In the attached drawings, FIG. 1 is a perspective view of a roasting device using an air flue according to an embodiment of the present invention, FIG. 2 is an exploded perspective view of the roasting device using the air flue according to the embodiment of the present invention, FIG. 3 is a perspective view illustrating a cooking grill plate of the roasting device using the air flue according to the embodiment of the present invention, FIG. 4 is a cross-sectional configuration diagram illustrating a horizontal opening or closing member of the roasting device using the air flue according to the embodiment of the present invention, and FIG. 5 is an exploded perspective view illustrating a fuel wood combustion container and the cooking grill plate of the roasting device using the air flue according to the embodiment of the present invention.

As shown in FIGS. 1 to 5, the roasting device using the air flue according to the embodiment of the present invention includes a fuel wood combustion container 10 having a semispherical shape and including a combustion chamber 10a for burning fuel wood therein, a cooking grill plate 30 connected to a top of the fuel wood combustion container 10 to be openable or closable by a horizontal opening or closing member 40 and including an air flue chamber 30a, into which high-temperature smoke generated in the combustion chamber 10a flows, to cook meat and fish using smoke, a smoke outlet 50 fastened to an upper part of the air flue chamber 30a to communicate with the air flue chamber 30a to discharge smoke outside, an ash pan and air adjusting unit 60 provided to communicate with and attachable to or detachable from a lower part of the fuel wood combustion chamber 10 so as to adjust an inflow of air into the roasting device while ashes generated in the fuel wood combustion container 10 are disposed thereon, and a support member 80 including height adjusting legs 86 provided equidistantly below the ash pan and air adjusting unit 60 to support the roasting device in a balanced manner.

The cooking grill plate 30 includes a lower end finishing plate 32 mounted on an outer circumferential surface of an upper end of the fuel wood combustion container 10 and including a smoke inlet 32a formed to communicate with the combustion chamber 10a of the fuel wood combustion container 10, a circular case 34 including a lower end fixed to an outer circumferential surface of an upper part of the lower end finishing plate 32 to be stepped inward and having an open top, a cooking steel plate 36, under which the air flue chamber 30a is formed by horizontally finishing an inner circumferential surface of an upper part of the circular case 34, and on which a cooking space 30b is formed at an upper part thereof, and a smoke inducing plate 38 fixed between the upper part of the lower end finishing plate 32, the inner circumferential surface of the circular case 34, and a lower part of the cooking steel plate 36 to induce smoke to flow into the air flue chamber 30a.

Here, so as to increase convenience, the upper part of the cooking steel plate 36 is divided in half so that hexagonal grooves 36a are arranged in a honeycomb structure and collect fat to prevent meat from being stuck while being cooked and horizontal protrusions 36b are formed to form striped grill marks on meat while the meat is cooked.

The horizontal opening or closing member 40 includes a support hole 42 formed to pass through an edge of the lower end finishing plate 32 to communicate with the combustion chamber 10a of the fuel wood combustion container 10 and the air flue chamber 30a of the cooking grill plate 30, a hinge pole 44 provided between the lower end finishing plate 32 above the support hole 42, the inner circumferential surface of the circular case 34, and the lower part of the cooking steel plate 36 and including a rotation hole 44a, and a vertical rotating pole 46 configured to protrude from and integrally formed on one side inside the fuel wood combustion container 10 to be rotatably coupled with the support hole 42 and the rotation hole 44a so as to open or close the cooking grill plate 30 from the fuel wood combustion container 10.

The smoke outlet 50 includes an assembling fixing hole 52 integrally formed on an upper edge of the cooking steel plate 36 of the cooking grill plate 30 and including a screw hole 52a, a smoke discharge hole 54 formed to pass through the cooking steel plate 36 corresponding to the screw hole 52a of the assembling fixing hole 52 to discharge smoke, a lower flue 56 separably screw-fastened to the screw hole 52a of the assembling fixing hole 52, and an upper flue 58 screw-fastened to the lower flue 56 such that a lower part is separable and communicates therewith.

Here, an upper loading plate 57 including a loading groove 57a is separably coupled with an outer circumferential surface of the upper flue 58 so as to put tongs/vegetables or the like thereon or may be used as a handle when the cooking grill plate 30 is opened or closed from the fuel wood combustion container 10.

Figure 6:
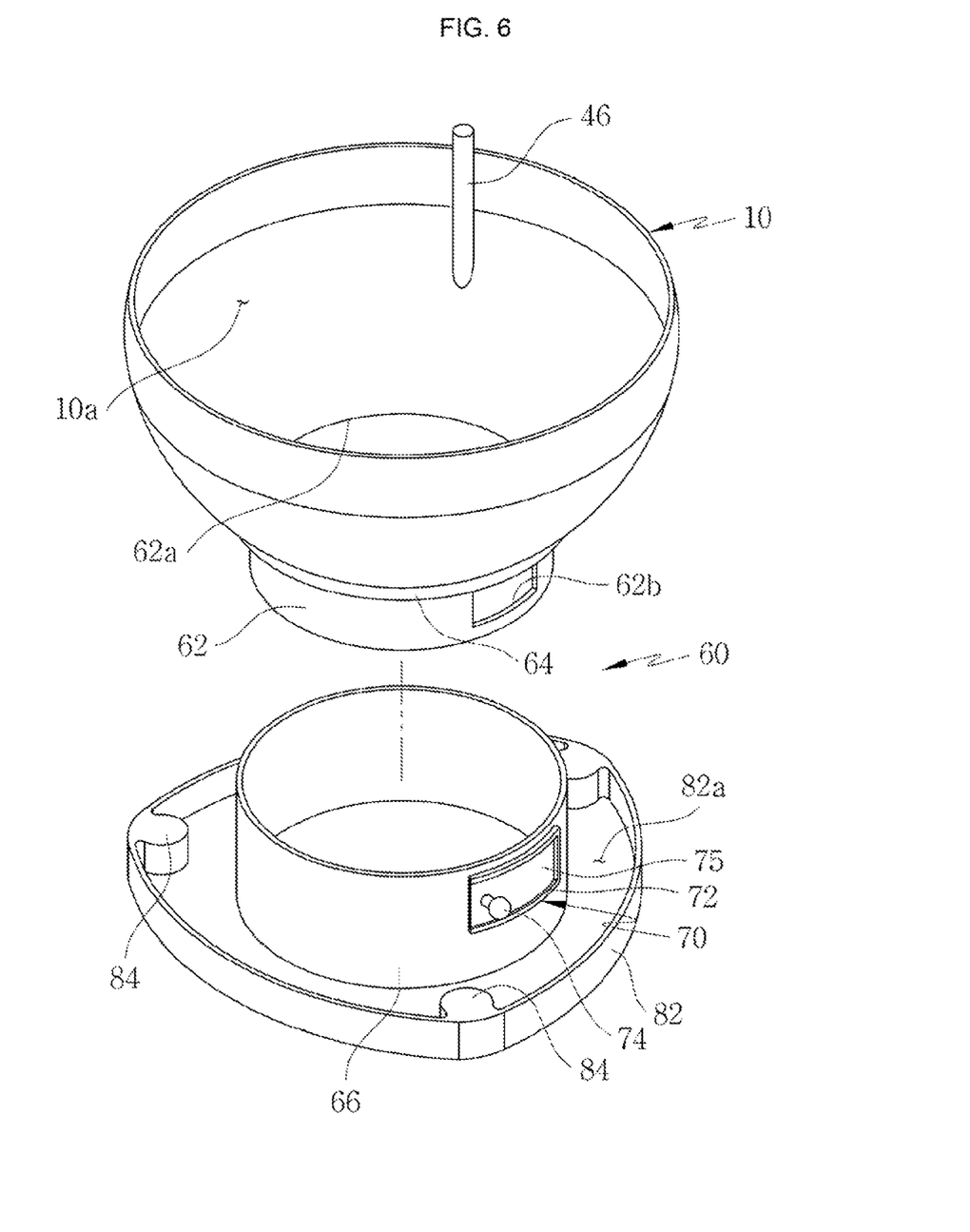
FIG. 6 is an exploded perspective view illustrating an ash pan and an air adjusting member of the roasting device using the air flue according to the embodiment of the present invention.

Meanwhile, as shown in FIG. 6, the ash pan and air adjusting unit 60 includes an inner fixing case 62 including an inside air inlet hole 62b and an air flow hole 62a which communicates with the lower part of the fuel wood combustion container 10, an outer fixing case 64 formed at the lower part of the fuel wood combustion container 10 while maintaining a gap with the inner fixing case 62 to form an insertion groove 63, an ash pan case 66 separably coupled with the insertion groove 63 between an outer circumferential surface of the inner fixing case 62 and an outer circumferential surface of the outer fixing case 64, including an outside air flow hole 66a formed to communicate with the inside air inlet hole 62b, and in which ashes are disposed, and an outside air adjusting member 70 provided on the ash pan case 66 on an outer circumferential surface of the outside air flow hole 66a to selectively block the inside air inlet hole 62b and the outside air flow hole 66a.

Here, a fuel wood loading place 68, on which fuel wood is loaded to be burned in the combustion chamber 10a of the fuel wood combustion container 10, is mounted on a bottom surface of the ash pan case 66 and an inner circumferential surface of the inner fixing case 62.

The fuel wood loading place 68 is formed as a stainless steel mesh such that outside air easily passes toward fuel wood loaded thereon.

The outside air adjusting member 70 includes a guide 72 provided on an outer surface of the ash pan case 66 on the outer circumferential surface of the outside air flow hole 66ab and including a guide groove 72a, which extends, and includes an air blocking plate 75 movably coupled with the guide groove 72a of the guide 72 to selectively block the inside air inlet hole 62b and the outside air flow hole 66a.

Figure 7:
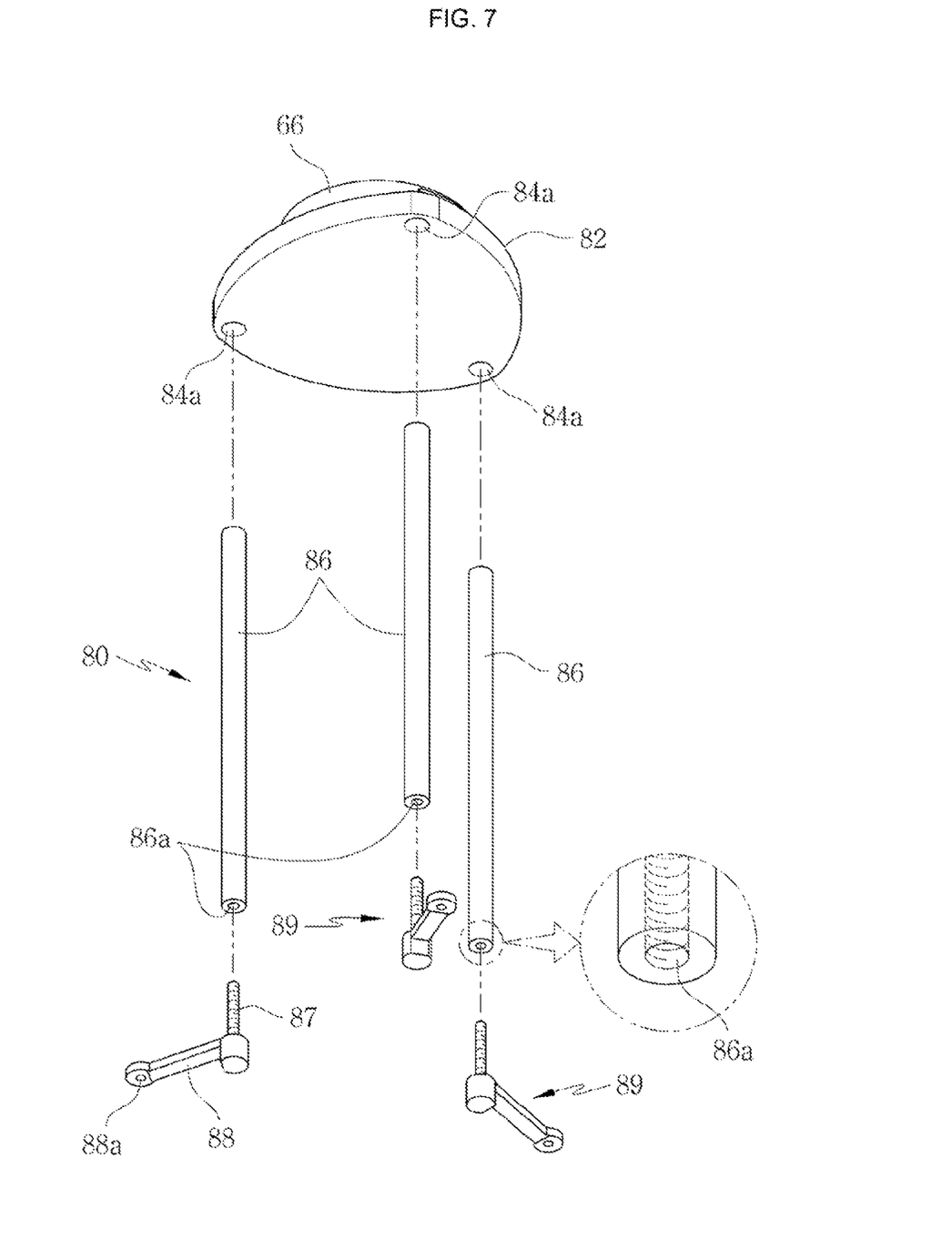
FIG. 7 is an exploded perspective view illustrating a support member of the roasting device using the air flue according to the embodiment of the present invention.

Also, as shown in FIG. 7, the support member 80 includes a triangular storage plate 82 having an upper area fixed to a lower end of the ash pan case 66 and including a storage groove 82a at an upper part thereof, a plurality of upper fixing holes 84 each formed to protrude from a corner area of the triangular storage plate 82 and including an insertion groove 84a with an open bottom, the height adjusting legs 86 each having an upper part coupled with the insertion groove 84a of the upper fixing hole 84 at the same height and including a screw hole 86a formed in an inner diameter of a lower part thereof, and supports 89 each including a height adjusting bolt 87 formed to protrude and fastened to the screw hole 86a of the height adjusting leg 86 to adjust a height of the height adjusting leg 86 and an inclined fixing hole 88 with a pin insertion hole 88a fixed to a bottom surface by a fixing pin 90.

Water or sand is stored in the storage groove 82a in the triangular storage plate 82 such that the level of the roasting device may be horizontally adjusted and sparks, embers, or the like may be removed effectively.

Meanwhile, a fat outlet 100 is formed to pass through an upper edge of the cooking steel plate 36 so as to discharge fat, which is collected while meat is cooked, into the fuel wood combustion container 10.

The fat outlet 100 is formed in the cooking steel plate 36 on one side of the assembling fixing hole 52 to communicate with the rotation hole 44a of the hinge pole 44 included in the horizontal opening or closing member 40 and prevents fat generated during cooking from flowing outside when the cooking grill plate 30 is open by being rotated while the fat passes through the fat outlet 100, the rotation hole 44a, and the support hole 42 of the lower end finishing plate 32 and flows into the fuel wood combustion container 10.

Assembling and operation states of the above-described roasting device using the air flue according to the embodiment of the present invention will be schematically described below.

Figure 8:
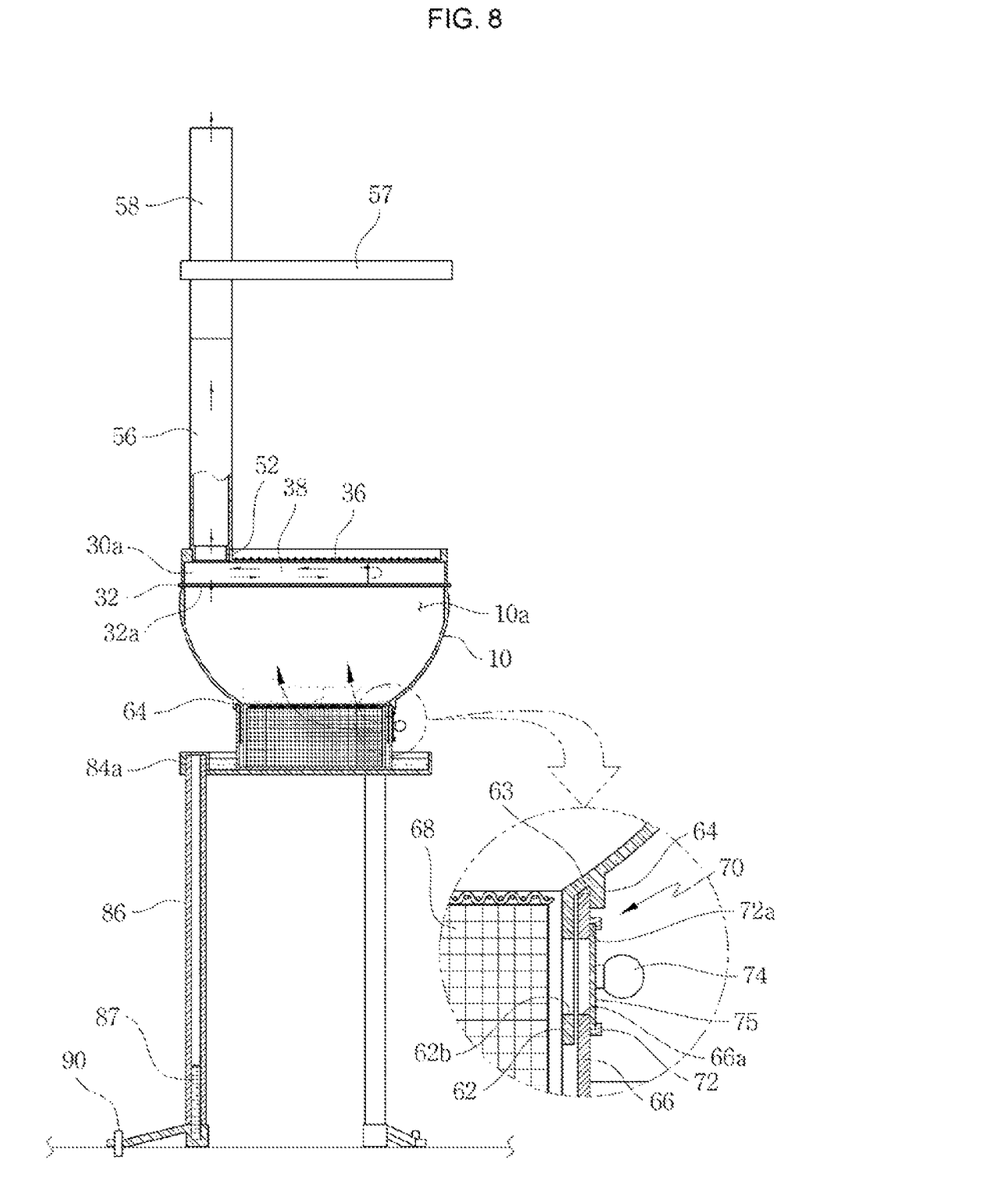
FIG. 8 is a cross-sectional configuration diagram illustrating an operating state of the roasting device using the air flue according to the embodiment of the present invention.

As shown in FIG. 8, an upper part of the height adjusting leg 86 is coupled with the insertion groove 84a of the upper fixing hole 84 formed at the corner area of the triangular storage plate 82 and the height adjusting bolt 87 of the support 89 is coupled with the screw hole 86a of the height adjusting leg 86 sequentially and then a height of the height adjusting leg 86 is adjusted to be adequate for an installation location by rotating the support 89. As necessary, the fixing pin 90 is coupled through the pin insertion hole 88a of the inclined fixing hole 88 such that the roasting device is stably fixed.

Here, when a height of the support 89 is adjusted, the roasting device is adjusted to be inclined to maintain a state in which the fat outlet 100 tilts so as to easily discharge fat into the combustion chamber 10a of the fuel wood combustion container 10 through the fat outlet 100 above the cooking steel plate 36 (refer to FIG. 7).

In this state, as shown in FIGS. 1 and 2, the upper loading plate 57 coupled with the outer circumferential surface of the upper flue 58 included in the smoke outlet 50 screw-fastened to the upper part of the cooking grill plate 30 is gripped, the cooking grill plate 30 openably connected to the upper part of the fuel wood combustion container 10 is opened by the horizontal opening or closing member 40, an adequate number of pieces of fuel wood (not shown) are disposed on the fuel wood loading place 68 mounted on the bottom surface of the ash pan case 66 and the inner circumferential surface of the inner fixing case 62 and are ignited quickly, and the cooking grill plate 30 is closed such that the combustion chamber 10a of the fuel wood combustion container 10 is completely blocked using the lower end finishing plate 32 (refer to FIGS. 4 and 5).

Afterwards, outside air is supplied to an inside of the combustion chamber 10a of the fuel wood combustion container 10 by operating the outside air adjusting member 70 included in the ash pan and air adjusting unit 60.

To schematically describe an operation of the outside air adjusting member 70, as shown in FIG. 6, when the air blocking plate 75 movabaly coupled with the guide groove 72a of the guide 72 provided on the outer surface of the ash pan case 66 is moved by a handle 74, the air blocking plate 75 moves along the guide groove 72a and the inside air inlet hole 62b and the outside air flow hole 66a are opened such that outside air quickly flows in through the outside air flow hole 66a and the inside air inlet hole 62b and passes through the fuel wood loading place 68 formed of the stainless steel mesh mounted on the bottom surface of the ash pan case 66 and the inner circumferential surface of the inner fixing case 62 to be supplied to the ignited fuel wood. Accordingly, the fuel wood is burned and an internal temperature of the combustion chamber 10a increases such that smoke is generated.

As described above, the high-temperature smoke generated in the combustion chamber 10a quickly flows into the air flue chamber 30a through the smoke flow hole 32a of the lower end finishing plate 32 and is induced along and stays on the smoke inducing plate 38 between the upper part of the lower end finishing plate 32, the inner circumferential surface of the circular case 34, and the lower part of the cooking steel plate 36 to gradually heat the cooking steel plate 36 thereabove such that meat and fish are cooked in the cooking space 30b above the cooking steel plate 36 without being burned.

Here, the high-temperature smoke in the air flue chamber 30a is quickly discharged outside through the lower flue 56 fastened to the screw hole 52a of the assembling fixing hole 52 of the upper edge of the cooking steel plate 36 to communicate with the air flue chamber 30a and the upper flue 58 fastened to the lower flue 56.

Meanwhile, as shown in FIG. 8, ashes generated while fuel wood is continuously burned pass through the mesh of the fuel wood loading place 68 and fall to and are stacked on a bottom of the ash pan case 66. The ashes stacked on the bottom are separately treated after cooking is completed.

To schematically describe an ash treatment operation, the fuel wood combustion container 10 is lifted upward such that the inner fixing case 62 and the insertion groove 63 of the outer fixing case 64 below the fuel wood combustion container 10 are separated from the ash pan case 66.

Afterwards, the insertion groove 84a of the upper fixing hole 84 formed in the triangular storage plate 82 is separated from the upper part of the height adjusting leg 86, the fuel wood loading place 68 is separated, and ashes on the bottom of the ash pan case 66 are separately treated.

INDUSTRIAL APPLICABILITY

According to the embodiment of the present invention, high-temperature smoke generated while fuel wood is burned in a combustion chamber of a fuel wood combustion container is supplied to an inside of an air flue chamber of a cooking grill plate and is induced along a smoke inducing plate simultaneously while being discharged outside through a smoke outlet such that a cooking steel plate is gradually heated so as to cook meat, fish, or the like without being burned to provide healthy food.

The invention claimed is:

1. A roasting device using an air flue, comprising:
   a fuel wood combustion container (10) in which a combustion chamber (10a) is formed to burn fuel wood;
   a cooking grill plate (30) connected to an upper part of the fuel wood combustion container (10) to be openable or closable by a horizontal opening or closing member (40) and in which an air flue chamber (30a), into which high-temperature smoke generated in the combustion chamber (10a) flows, is formed to cook meat and fish with smoke;
   a smoke outlet (50) fastened to an upper part of the cooking grill plate (30) to communicate with the air flue chamber (30a) to discharge smoke outside;
   an assembling fixing hole (52) integrally formed on an upper edge of a cooking steel plate (36) of the cooking grill plate (30) and including a screw hole (52a);
   a smoke discharge hole (54) formed to pass through the cooking steel plate (36) corresponding to the screw hole (52a) of the assembling fixing hole (52) to discharge smoke;
   a lower flue (56) separably screw-fastened to the screw hole (52a) of the assembling fixing hole (52); and
   an upper flue (58) having a lower part screw-fastened to the lower flue (56) to be separable therefrom and to communicate therewith and an outer circumferential surface with which an upper loading plate (57) is separably coupled
   an ash pan and air adjusting unit (60) provided to communicate with a lower part of the fuel wood combustion container (10) to adjust an inflow of outside air into the roasting device and on which ashes generated in the fuel wood combustion container (10) are disposed; and
   a support member (80) including height adjusting legs provided equidistantly in an area below the ash pan and air adjusting unit (60) to support the roasting device in a balanced manner.

2. The roasting device of claim 1, wherein the cooking grill plate (30) comprises:
   a lower end finishing plate (32) mounted on an outer circumferential surface of an upper end of the fuel wood combustion container (10) and including a smoke inlet (32a) formed to communicate with the combustion chamber (10a) of the fuel wood combustion container (10);
   a circular case (34) including a lower end fixed to an outer circumferential surface of an upper part of the lower end finishing plate (32) to be stepped inside and having an open top;
   a cooking steel plate (36) under which the air flue chamber (30a) is formed by horizontally finishing an inner circumferential surface of an upper part of the circular case (34) and on which a cooking space (30b) is formed at an upper part; and
   a smoke inducing plate (38) fixed between the upper part of the lower end finishing plate (32), the inner circumferential surface of the circular case (34), and a lower part of the cooking steel plate (36) to induce smoke flowing into the air flue chamber (30a).

3. The roasting device of claim 2, wherein a fat outlet (100) is formed on an upper edge of the cooking steel plate (36) of the cooking grill plate (30) so as to discharge fat into the fuel wood combustion container 10.

4. The roasting device of claim 1, wherein the horizontal opening or closing member (40) comprises:
   a support hole (42) formed to pass through an edge of a lower end finishing plate (32) to communicate with the combustion chamber (10a) of the fuel wood combustion container (10) and the air flue chamber (30a) of the cooking grill plate (30);
   a hinge pole (44) provided between the lower end finishing plate (32) above the support hole (42), an inner circumferential surface of a circular case (34), and a lower part of a cooking steel plate (36) and including a rotation hole (44a); and
   a vertical rotating pole (46) integrally configured to protrude from and formed on one side inside the fuel wood combustion container (10) to be rotatably coupled with the support hole (42) and the rotation hole (44a) so as to open or close the cooking grill plate (30) from the fuel wood combustion container (10).

5. The roasting device of claim 1, wherein the ash pan and air adjusting unit (60) comprises:
   an inner fixing case (62) including an inside air inlet hole (62b) and an air flow hole (62a) which communicates with the lower part of the fuel wood combustion container (10);
   an outer fixing case (64) formed at the lower part of the fuel wood combustion container (10) while maintaining a gap with the inner fixing case (62) to form an insertion groove (63);
   an ash pan case (66) separably coupled with the insertion groove (63) between an outer circumferential surface of the inner fixing case (62) and an inner circumferential surface of the outer fixing case (64), including an outside air flow hole (66a) formed to communicate with the inside air inlet hole (62b), and in which ashes are disposed;
   a fuel wood loading place (68) mounted on a bottom surface of the ash pan case (66) and an inner circumferential surface of the internal fixing case (62) and on which fuel wood is loaded to be burned in the combustion chamber (10a) of the fuel wood combustion container (10); and
   an outside air adjusting member (70) provided on the ash pan case (66) on an outer circumferential surface of an outside air flow hole (66a) to selectively block the inside air inlet hole (62b) and the outside air flow hole (66a).

6. The roasting device of claim 1, wherein the support member (80) comprises:
- a triangular storage plate (82) having an upper area fixed to a lower end of an ash pan case (66) and including a storage groove (82*a*) at an upper part thereof in which water or sand is stored;
- a plurality of upper fixing holes (84) each formed to protrude from a corner area of the triangular storage plate (82) and including an insertion groove (84*a*);
- height adjusting legs (86) each having an upper part coupled with the insertion groove (84*a*) of the fixing hole (84) and including a screw hole (86*a*) formed in an inner diameter of a lower part thereof; and
- supports (89) each including a height adjusting bolt (87) fastened to the screw hole (86*a*) of the height adjusting leg (86) to adjust a height of the height adjusting leg (86) and an inclined fixing hole (88) with a pin insertion hole (88*a*) fixed to a bottom surface by a fixing pin (90).

\* \* \* \* \*